2,315,341

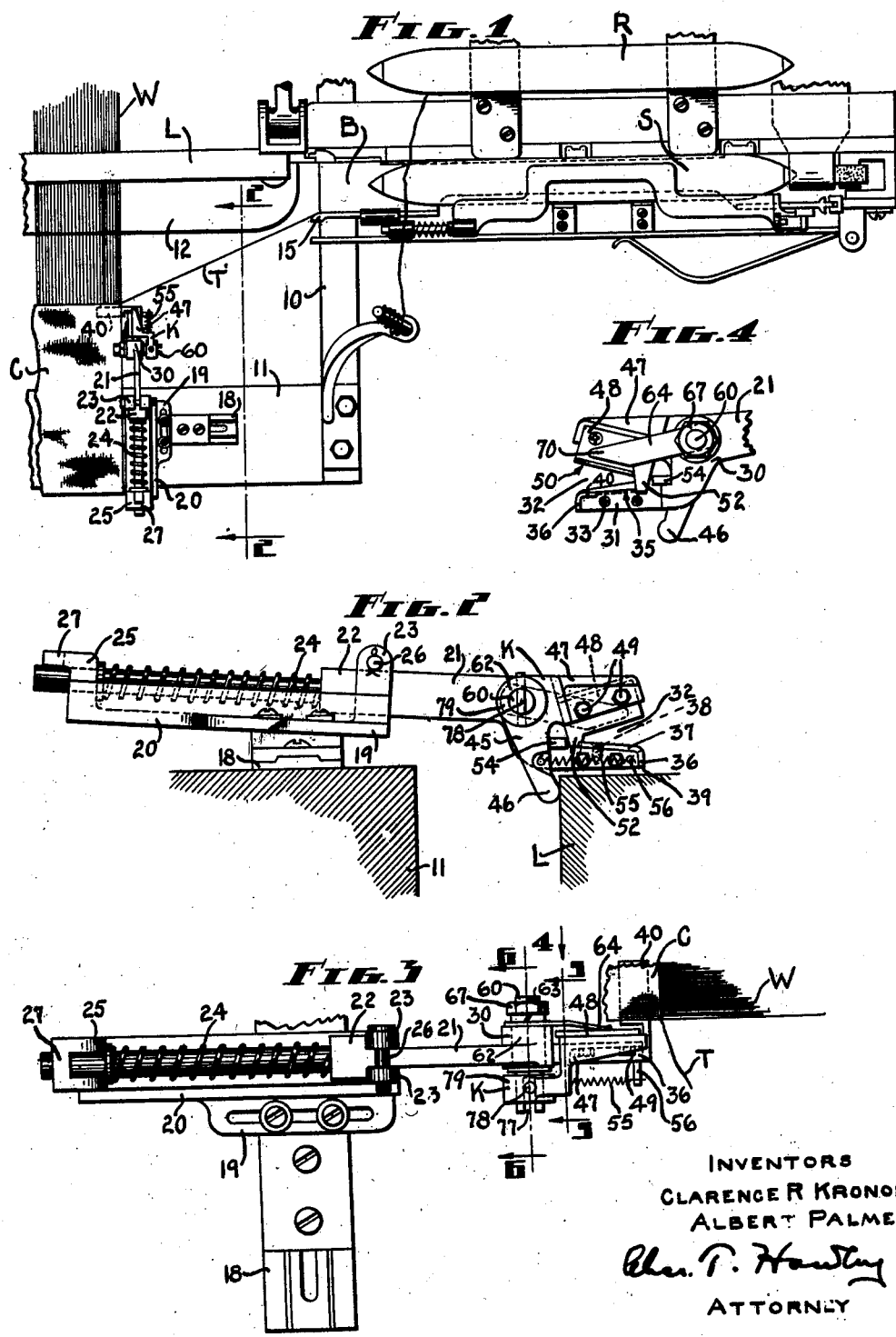

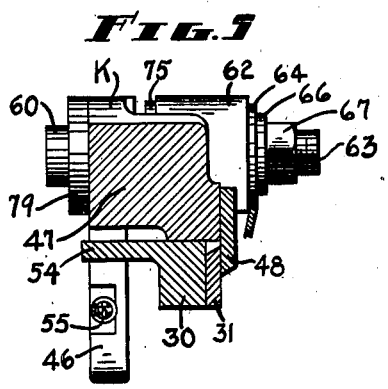
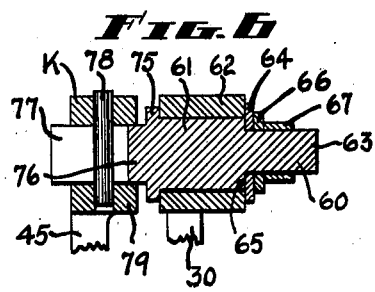
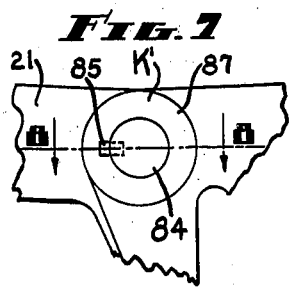
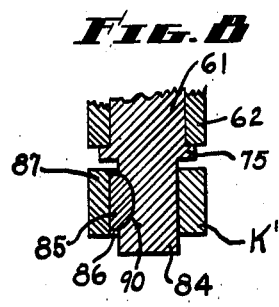
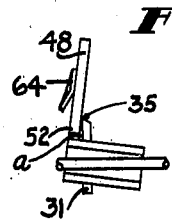
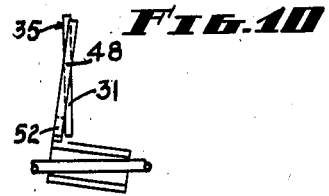
INVENTORS
CLARENCE R. KRONOFF
ALBERT PALMER
ATTORNEY Patented Mar. 30, 1943

UNITED STATES PATENT OFFICE 2,315,341

THREAD CUTTER FOR LOOMS

Clarence R. Krenoff and Albert Palmer, Worcester, Mass., assignors to Crompton & Knowles Loom Works, Worcester, Mass., a corporation of Massachusetts Application September 21, 1942, Serial No. 459,146

7 Claims. (Cl. 139—303)

This invention relates to improvements in thread cutters for looms and it is the general object of the invention to provide a cutter in which one of the blades, preferably the moving blade, is held resiliently against the other blade but is free to move laterally for the purpose of maintaining proper cutting relation between the blades.

A common type of thread cutter heretofore used has employed two blades which move in fixed planes and have flat surfaces which slide along each other. A high spot on one of the blades will engage the other blade and spring the blades apart slightly so that their cutting edges do not contact. The movable blade has generally had a hub having a snug fit with the supporting stud to require it to move in the plane of the fixed blade. It is an important object of our present invention to provide a sufficiently loose fit between the stud and the movable blade to permit the latter to move angularly to a slight degree with respect to its supporting stud and thereby maintain a travelling point of engagement between the two cutting edges as the cutter closes.

It is a further object of our present invention to cause the stud and the movable jaw mounted on it to turn in the support for the other blade and secure a spring to the stud which will remain in pressing engagement with the cutting edge of the movable blade throughout the cutting operation.

With these and other objects in view which will appear as the description proceeds, our invention resides in the combination and arrangement of parts hereinafter described and set forth.

In the accompanying drawings, wherein two forms of mounting for the movable cutter blade are shown:

Fig. 1 is a plan view of the replenishing end of a loom having the preferred form of our invention applied thereto, Fig. 2 is a vertical section on an enlarged scale on line 2—2 of Fig. 1, Fig. 3 is a plan view of the structure shown in Fig. 2, Fig. 4 is a side elevation of the cutter as seen from the center of the loom and looking in the direction of arrow 4, Fig. 3, Figs. 5 and 6 are enlarged vertical sections on lines 5—5 and 6—6, respectively, of Fig. 3, Fig. 7 is a view similar to a portion of Fig. 2 but showing a modified form of mounting for the movable cutter, Fig. 8 is a vertical section on line 8—8 of Fig. 7, Fig. 9 is a diagrammatic front elevation of the cutter blades showing the tilting of the top blade relatively to the bottom blade, and Fig. 10 is a diagrammatic plan of the cutter blades showing the obliquity of the top blade with respect to the bottom blade.

Referring particularly to Figs. 1, 2 and 3, we have shown a loom frame 10 having a breast beam 11 over which moves the cloth C attached to the rearwardly extending warp W. The lay L has a race plate 12 and is provided at the right end in the present instance with vertically shifting shuttle boxes B. The boxes form part of a shuttle changer mechanism of the general type set forth in prior Patent No. 2,054,171 to which reference may be had for an understanding of the particular replenishing mechanism in connection with which we illustrate our invention. Reserve shuttles one of which is shown at R move successively into the box mechanism B during the replenishing operation of the loom and the depleted shuttle S moves forwardly by mechanism not shown but shown in the aforesaid patent. At the time of a replenishing operation the thread T extends from the fell of the cloth into the shuttle box around a box front 15 to be connected to the shuttle and as the latter is discharged forwardly from the box B the thread T will remain in the shuttle box for several picks awaiting cutting at the selvage. It is not thought necessary to give further details as to the operation of the box mechanism B since our invention is not necessarily limited to a shuttle changing loom.

Secured to the breast beam 11 is a plate 18 extending transversely of the cloth and having adjustably secured thereto the foot 19 of a guide 20 in which is mounted for horizontal reciprocation an elongated carrier 21. The latter has a shoulder 22 which is held against spaced lugs 23 on the guide by a compression spring 24 the forward end of which engages a bearing 25 also on the guide 20. A pin 26 between the lugs 23 extends over the carrier to limit upward movement of the rearward part of the latter, while the bearing 25 is provided with a bridge 27 extending over the forward end of the carrier. The carrier is thus guided for back and forth motion on its fixed support and can be removed by taking out the pin 26 and then lifting the rear end of the carrier until the shoulder 22 is above the lugs 23, after which rearward movement of the carrier will move the forward end thereof to a position behind the bridge 27.

The rear part of the carrier 21 is provided with a head 30 to the lower part of which is secured a cutter blade 31. A thread receiving notch 32 is formed in the head over blade 31 and the latter is bolted as at 33 to the head and has an upwardly facing cutting edge 35. A thread guide 36 formed conveniently of pressed metal has a forward finger 37 secured at 38 to the top of that part of the head under notch 32 and to which the blade 31 is secured. The guide is bent down as at 39 to have contact with the lower rear part of the head and has a laterally extending arm 40 to project under the cloth C. The arm 40 is so located that as the thread T travels forwardly with the cloth it will move into the notch 32.

The movable cutter element K comprises a two-arm lever 45 the lower arm 46 of which extends downwardly for engagement with the lay. The upper horizontally extending arm 47 of lever 45 carries a blade 48 secured thereto by bolts 49 and has a downwardly facing cutting edge 50 to cooperate with the edge 35. The forward lower end of the blade 48 has a depending finger 52 which is always in engagement with the forward part of the blade 31. This finger is in the same plane as the blade 48. A stop 54 on the head limits rearward movement of arm 46 under action of a light tension spring 55 connected to arm 46 and to a stud 56 projecting laterally from the head.

The movable cutter element is mounted on a stud designated generally at 60. This stud has a journal 61 which turns in a bearing 62 on the carrier 21 and with which it has a close fit. The right end of the stud as seen in Fig. 6 is reduced and threaded as at 63 to receive the forward end of a flat spring 64 held against shoulder 65 of the journal 61 by a washer 66 and nut 67. The shoulder 65 extends beyond the bearing 62 only enough to provide clearance, and the nut 67 holds the flat spring tightly to the stud. The spring is formed as shown more particularly in Fig. 4 and has the lower inclined end 70 thereof held in close contact with blade 48 adjacent to the cutting edge 50. The stud rotates in bearing 62, hence the spring 64 is able to exert pressure near the cutting edge of the blade 48 for all angular positions of the movable cutter element. Stud 60 has a collet 75 on that side of the journal opposite spring 64 for engagement with the left end of bearing 62 as viewed in Fig. 6.

The matter thus far described is common to both forms of our invention. In the preferred form the end 76 of the stud adjacent to collet 75 is formed with a radial slot 77 substantially vertical when the parts are as shown in Fig. 2. A pin 78 extends through the slot and is secured to the hub 79 of the cutter element 45. The hub fits loosely on the slotted end of the stud, having several thousandths of an inch clearance, so that the element K is capable of a slight angular movement relatively to the end 76 of the stud. The pin 78 requires the stud to turn in bearing 62 when the lay engages arm 46 and is the means by which the spring 64 is caused to move with the blade 48 as already described. The effect of the spring is to hold the collet 75 against the adjacent end of bearing 62 and also to hold the finger 52 of blade 48 against the blade 31.

In the modified form of the invention shown in Figs. 7 and 8 the element K' is similar to element K in that it has the journal 61 and collet 75, but the end 84 has a key 85 which is located in a slot 86 cut in the hub 87, otherwise similar to hub 79 of the movable cutter element. Hub 87 has a loose fit with respect to the end 84 and the key 85 lies in a horizontal plane when the cutter is open. The edge of the key which fits into end 84 is arcuate to fit a corresponding surface on the bottom of the key slot 90 in end 84. The hub 87 can therefore rock to a slight degree in a horizontal plane on end 84, and a looseness of fit between the key and either of the slots which it enters permits a slight angular movement in a vertical plane.

In operation, the arm 46 is moved forwardly by the lay each pick of the loom but the cutter blades are set far enough in advance of the fell of the cloth so that they do not strike the thread T under normal weaving operations. If the shuttle is discharged forwardly from the box B while still attached to the thread T, the latter will extend from the selvage into and remain in the box as cloth is woven by the new shuttle. Eventually the advancing cloth will move the thread T into the notch 32 and the rocking of element K or K' by arm 46 and the lay will cut the thread T.

At the beginning of the cutting operation when the blade 48 is raised the spring 64 will exert a pressure on the blade tending to cause its rear end to overhang the blade 31 so that the cutting edges 35 and 50 are slightly oblique, as shown in Fig. 10. This relationship is due to the looseness of fit between the hub of the moving cutter element and the end of the stud which fits into the hub. Also, as seen in Fig. 4 the rear end of spring 64 exerts a lateral pressure on blade 48 above the finger 52 to effect a slight tilting of the plane of the cutter 48 with respect to the blade 31, due to the previously described looseness of fit, in such a direction that the upper part of the blade 48 will be behind the plane passing through the cutting edge 35, of the blade 31. This relationship is shown diagrammatically in Fig. 9. The looseness of fit between the stud and the elements K and K' is therefore seen to result in two types of obliquity between the cutting blades, one resulting in an overhanging of the cutting edges and the other causing the top blade to lie out of the plane of the bottom blade by inclination in such a direction that the plane of the top blade passing through its cutting edge 50 passes downwardly and away from the blade 31. As the top blade descends the element K or K' will turn slightly in a counter-clockwise direction as viewed in Fig. 3 so that the traveling point of contact between the edges 35 and 50 will be maintained. This angular movement is due in the preferred form to the fact that the element K turns around pin 78 and in the modified form it is due to the arcuate bottom of the key 85.

During descent of the blade 48 it is maintained at a slight angle to the blade 31 as already described so that a clearance is provided and that part of blade 48 which moves below cutting edge 35 is away from the blade 31 and therefore any slight irregularity, such as a high spot on the blade 31 will not touch the blade 48. This clearance is indicated at a, Fig. 9. The spring 64 plays an important part in establishing the two angular relationships described but yields during turning of the elements K and K'. The relation between the foot 52, the stud and the point of engagement between the spring 64 and the blade 48 also has an important bearing in determining the initial angular relation of the cutting edges and the blade. As the cutting operation proceeds the point of engagement between the cutting edges serves to supplement the effect of the finger 52, this point of engagement always being below the point of application of the spring pressure on the blade 48 to assist in preserving the aforesaid tilting.

From the foregoing it will be seen that we have provided a simple mounting for the cutter element 45 so constructed as to permit the element to have a slight angular movement as the blade 48 descends. Close engagement of the cutting blades is insured by the spring 64 and the connection between the element and the supporting stud permits the angular movement. The spring 64 is fastened to the stud, and since the latter turns with the element 45 the spring will always exert a pressure close to the cutting edge of the blade 48. Furthermore, the small depending finger 52 insures proper registry of the two blades at the beginning of the cutting operation, and assists in tilting the blade to provide clearance. Since the element 45 always turns with the stud the looseness of fit between the stud and the element hub does not cause any serious wear of these two parts.

Having thus described our invention it will be seen that changes and modifications may be made therein by those skilled in the art without departing from the spirit and scope of the invention and we do not wish to be limited to the details herein disclosed, but what we claim is:

1. In thread cutting mechanism for a loom having a frame and a lay with a shuttle from which a thread extends to the selvage, a carrier provided with a cutter blade mounted on the frame, a pivoted cutting element having a cutter blade thereon and an arm for engagement with the lay, pivot means on the carrier for the element and providing a loose fit therewith so that said element is capable of movement horizontally and vertically with respect to the pivot means, a spring supported by said pivot means and moving with and engaging the cutter blade on the element, and stop means on one blade engaging the other blade at a point out of alignment with a line joining the axis of the pivot means and a point at which the spring engages the cutter blade on said element, said spring and stop means causing the element normally to be disposed so that the blade thereof is oblique in a horizontal direction with respect to the blade on the carrier and inclined in a vertical direction with respect to the blade on the carrier, engagement of the lay with the arm causing the element to turn about the pivot means and the spring yielding to permit the second cutter to move laterally with respect to the blade on the carrier.

2. In thread cutting mechanism for a loom having a frame and a lay with a shuttle from which a thread extends to the selvage, a carrier provided with a cutter blade mounted on the frame, a pivoted cutting element having a cutter blade thereon and an arm for engagement with the lay, pivot means on the carrier for the element having with the latter a loose fit which permits the element to move angularly with respect to the pivot means in horizontal and vertical directions, stop means on one blade to engage the other blade, a spring to engage the second blade at a point out of alignment with a line passing through the axis of the pivot means and the stop means and to the rear of the latter with respect to the pivot means to hold the second blade normally oblique in a horizontal direction with respect to the blade on the carrier and inclined in a vertical direction with respect to the blade on the carrier, said element movable angularly around the axis of the pivot means and also horizontally to change the obliquity thereof relatively to the blade on the carrier when the lay moves said arm.

3. In thread cutting mechanism for a loom having a frame and a lay with a shuttle from which a thread extends to the selvage, a carrier provided with a cutter blade mounted on the frame, a pivoted cutting element having a cutter blade thereon and an arm for engagement with the lay, pivot means on the carrier for the element having with the latter a loose fit which permits the element to move angularly with respect to the pivot means in horizontal and vertical directions, stop means on one blade to engage the other blade, a spring to engage the second blade at a point out of alignment with a line passing through the axis of the pivot means and the stop means and to the rear of the latter with respect to the pivot means to hold the second blade normally oblique in a horizontal direction with respect to the blade on the carrier and inclined in a vertical direction with respect to the blade on the carrier, said element movable angularly around the axis of the pivot means and also horizontally to change the obliquity thereof relatively to the blade on the carrier and also maintain the cutter on the element inclined with respect to the blade on the carrier when the lay moves said arm.

4. In thread cutting mechanism for a loom having a frame and a lay with a shuttle from which a thread extends to the selvage, a carrier mounted on the frame, a cutter blade mounted on the carrier, a pivoted cutting element having a cutter blade thereon and an arm for engagement with the lay, a stud rotatably mounted in the carrier and having one end extending through the pivoted cutter element, stop means on the stud to engage the carrier and limit movement of the stud in a direction from said element to the carrier, holding means on the other end of the stud, a spring between said holding means and the carrier, said holding means and spring limiting movement of the stud in a direction from the carrier to the pivoted element and said spring engaging the blade on the pivoted element adjacent the cutting edge thereof, and means to cause the stud and spring to turn with said element when the lay engages said arm.

5. In thread cutting mechanism for a loom having a frame and a lay with a shuttle from which a thread extends to the selvage, a carrier mounted on the frame having a cutter blade fixed thereto, a stud rotatably mounted on said carrier, means on the stud to limit lateral movement thereof in one direction with respect to the carrier, a pivoted cutter element on the stud beyond said means with respect to the carrier and having a loose fit with the stud to be capable of limited angular movement relatively to the stud, a spring on the other end of the stud to hold the spring in a position adjacent to the carrier to engage the latter and limit movement of said stud in a direction opposite to said one direction, a cutter blade fixed on said element against which said leaf spring presses, an arm on said element for engagement with the lay, means to cause the element and stud to turn together when the arm is engaged by the lay, and means on one of said blades to engage the other blade to limit movement of the element on the stud in a direction away from said carrier and cooperate with said spring to maintain the element normally oblique with respect to the stud, engagement of the arm with the lay causing the element and stud to turn on the carrier and causing the blade of the element to move angularly laterally of the blade of the carrier against the action of said spring.

6. In thread cutting mechanism for a loom having a frame and a lay with a shuttle from which a thread extends to the selvage, a carrier mounted on the frame having a cutter blade fixed thereon, a stud rotatably mounted on said carrier, a spring mounted on one end of the stud at one side of the carrier, a pivoted cutter element mounted on the other end of the stud on the other side of the carrier, the element having a loose fit on the stud to be capable of angular movement thereon laterally of the carrier, a cutter blade on said pivoted element, said other end of the stud having a slot therein transverse to the cutting edge of said cutting element, a pin carried by said pivoted element and extending through the slot to cause the stud and pivoted element to move together and permit slight angular movement of said pivoted element on the stud in a plane perpendicular to said pin, and means on one of said blades to engage the other blade to limit movement of the pivoted element along the stud in a direction away from the carrier, said blades being slightly oblique with respect to each other and the loose fit between said pivoted element and said other end of the stud permitting said pivoted element to move angularly around the axis of said pin as the lay engages said arm and causes the rearmost point of engagement between said blades to travel rearwardly during a cutting operation.

7. In thread cutting mechanism for a loom having a frame and a lay with a shuttle from which a thread extends to the selvage, a carrier mounted on the frame, a cutter blade having a cutting edge mounted on the carrier, a stud rotatably mounted in said carrier, means to limit movement of the stud transversely with respect to the carrier in one direction, a leaf spring mounted on one end of the stud at one side of the carrier, a pivoted cutter element mounted on and having a loose fit with the other end of said stud on that side of the carrier opposite said spring, a cutter blade on said pivoted cutter element having a cutting edge, means on said one end of the stud to hold the leaf spring against the second cutter blade behind said stud, a key between said pivoted element and said other end of the stud constructed to permit said pivoted element to have a slight angular movement relatively to the stud in a plane passing through the axis of the stud, and stop means on one of said blades to engage the other blade and limit movement of the pivoted element under action of said spring in a direction away from the carrier, said stop means serving as a fulcrum for the pivoted element and cooperating with the spring and said other end of the stud to hold said pivoted element normally slightly oblique in a horizontal direction and inclined in a vertical direction with respect to the stud, closing action of the pivoted element caused by engagement of the arm with the lay causing a slight angular movement of said pivoted element in said plane as the bight between the cutting edges travels rearwardly during the cutting operation.

CLARENCE R. KRONOFF.
ALBERT PALMER.